US012732115B2

(12) United States Patent
Chieng et al.

(10) Patent No.: US 12,732,115 B2
(45) Date of Patent: Sep. 8, 2026

(54) BIDIRECTIONAL VOLTAGE CONVERSION DEVICE

(71) Applicant: National Yang Ming Chiao Tung University, Hsinchu City (TW)

(72) Inventors: Wei-Hua Chieng, Hsinchu City (TW); Edward Yi Chang, Baoshan Township (TW); Stone Cheng, Hsinchu City (TW); Ching-Yao Liu, Hsinchu City (TW); Yueh-Tsung Shieh, Hsinchu City (TW); Li-Chuan Tang, Taoyuan City (TW); Chih-Chiang Wu, Zhudong Township (TW); Wen-Yuh Shieh, Baoshan Township (TW); Chi-Chun Huang, Hsin-Chu (TW); Gang-Ting Liou, Taipei City (TW)

(73) Assignee: NATIONAL YANG MING CHIAO TUNG UNIVERSITY, Hsinchu City (TW)

( * ) Notice: Subject to any disclaimer, the term of this patent is extended or adjusted under 35 U.S.C. 154(b) by 183 days.

(21) Appl. No.: 18/767,079

(22) Filed: Jul. 9, 2024

(65) Prior Publication Data

US 2025/0253776 A1 Aug. 7, 2025

(30) Foreign Application Priority Data

Feb. 2, 2024 (TW) ................................ 113104204

(51) Int. Cl.
*H02M 3/335* (2006.01)
*H02M 1/00* (2006.01)
*H02M 3/00* (2006.01)

(52) U.S. Cl.
CPC ..... *H02M 3/33584* (2013.01); *H02M 1/0058* (2021.05); *H02M 3/01* (2021.05); *H02M 3/33571* (2021.05)

(58) Field of Classification Search
CPC ............... H02M 3/01; H02M 3/33571; H02M 3/33573; H02M 3/33576; H02M 3/33584; H02M 1/0058
See application file for complete search history.

(56) References Cited

U.S. PATENT DOCUMENTS 9,602,011 B1 * 3/2017 Baker ............... H02M 3/33507
10,587,201 B1 3/2020 Chen et al.

FOREIGN PATENT DOCUMENTS

CN 107888074 B * 11/2020 ........ H02M 3/33584
DE 202023105953 U1 * 1/2024 .............. B60L 53/24

OTHER PUBLICATIONS

DE-202023105953-U1 Translation (Year: 2024).*

(Continued)

*Primary Examiner* — Gary L Laxton
*Assistant Examiner* — Jennifer C Caulk
(74) *Attorney, Agent, or Firm* — Birch, Stewart, Kolasch & Birch, LLP

(57) ABSTRACT

A bidirectional voltage conversion device includes a first half-bridge switching circuit, a transformer, a first resonant capacitor, a double-pole double-throw relay, a second half-bridge switching circuit, a resonant inductor and a second resonant capacitor. The first half-bridge switching circuit is coupled to a high-voltage power storage device. The first resonant capacitor is coupled to the first half-bridge switching circuit and a primary winding. The double-pole double-throw relay is coupled to a first secondary side winding, a second secondary side winding and a grounding terminal. The second half-bridge switching circuit is coupled to a low-voltage power storage device. The resonant inductor and the second resonant capacitor are coupled in series (Continued)

between the second half-bridge switching circuit and a node between the first secondary side winding and the second secondary side winding.

10 Claims, 6 Drawing Sheets

(56) References Cited

OTHER PUBLICATIONS

He et al., "Comprehensive Analyses and Comparison of 1 kW Isolated DC-DC Converters for Bidirectional EV Charging Systems", IEEE Transactions on Transportation Electrification, Mar. 2017, vol. 3, No. 1, p. 147-156.
Shieh et al., "A Tum-Ratio-Changing Half-Bridge CLLC DC-DC Bidirectional Battery Charger Using a GaN HEMT", Energies, Aug. 10, 2023, 16, 5928, p. 1-28.

* cited by examiner

BIDIRECTIONAL VOLTAGE CONVERSION DEVICE

BACKGROUND OF THE INVENTION

This application claims priority for the TW application No. 113104204 filed on 2 Feb. 2024, the content of which is incorporated by reference in its entirely.

FIELD OF THE INVENTION

The present invention relates to a conversion device, particularly to a bidirectional voltage conversion device.

DESCRIPTION OF THE RELATED ART

The CLLC (Capacitor-Inductor-Inductor-Capacitor) converter is a power electronic converter used to perform voltage conversion, mainly used in the field of direct current to direct current (DC-DC) converters. The CLLC converter gets its name from the components used in its circuit topology, namely the capacitor (C) and the inductor (L).

CLLC converters are known for their high efficiency levels, especially at medium and high power levels. The converter's resonant operation reduces switching losses and increases overall efficiency. The resonant operation of CLLC converters helps reduce electromagnetic interference (EMI) emissions. The converter's soft-switching characteristics can reduce voltage and current stress, thereby minimizing the generation of high-frequency noise. CLLC converters provide flexibility in controlling the gain of output voltage. Voltage gain can be easily adjusted to meet specific system requirements by adjusting the turn ratio or operating frequency of transformer's winding. CLLC converters exhibit good load regulation characteristics and can effectively deal with various load changes. They maintain a stable output voltage even when the load changes significantly. Thus, CLLC converters are suitable for dynamic load applications. CLLC converters can support bidirectional power flow, allowing energy to be transmitted in both directions. This feature is particularly useful in applications such as electric vehicle charging, energy storage systems and inverters for parallel grids. However, due to the existence of multiple inductors and capacitors, CLLC converters usually involve complex circuit configurations compared to other converter topologies, such as boost or buck converters. This complexity increases the cost and size of the overall system. Inductors in CLLC converters often need to have large size and heavy weight, especially in high-power applications, which can adversely affect the size and weight of the system. Finally, the control of CLLC converters can be more complex than other converter topologies. To achieve optimal performance and efficiency, CLLC converters may require complex control methods and advanced modulation techniques.

To overcome the abovementioned problems, the present invention provides a bidirectional voltage conversion device, so as to solve the afore-mentioned problems of the prior art.

SUMMARY OF THE INVENTION

The present invention provides a bidirectional voltage conversion device, which solves the problem with complex switching frequency adjustment for a single transformer, flexibly adapts to the charging and discharging requirements of vehicular batteries, and guarantees smooth operation and efficient energy transmission.

In an embodiment of the present invention, a bidirectional voltage conversion device is provided. The bidirectional voltage conversion device includes a first half-bridge switching circuit, a transformer, a first resonant capacitor, a double-pole double-throw (DPDT) relay, a second half-bridge switching circuit, a resonant inductor and a second resonant capacitor. The first half-bridge switching circuit is coupled to a high-voltage power storage device. The transformer has a primary side winding, a first secondary side winding, and a second secondary side winding. The low-voltage terminal of the primary side winding is coupled to a grounding terminal. The low-voltage terminals of the first secondary side winding and the second secondary side winding are coupled to each other. One terminal of the first resonant capacitor is coupled to the first half-bridge switching circuit and another terminal of the first resonant capacitor is coupled to the high-voltage terminal of the primary side winding. The DPDT relay is coupled to the high-voltage terminal of the first secondary side winding, the high-voltage terminal of the second secondary side winding, and the grounding terminal. The second half-bridge switching circuit is coupled to a low-voltage power storage device. The resonant inductor and the second resonant capacitor are coupled in series between the second half-bridge switching circuit and a node between the low-voltage terminals of the first secondary side winding and the second secondary side winding.

In an embodiment of the present invention, the bidirectional voltage conversion device further includes a micro controller coupled to the first half-bridge switching circuit, the second half-bridge switching circuit, and the DPDT relay.

In an embodiment of the present invention, the first half-bridge switching circuit includes a first electronic switch and a second electronic switch coupled in series between the grounding terminal and the high-voltage power storage device. A node between the first electronic switch and the second electronic switch is coupled to the first resonant capacitor. The control terminals of the first electronic switch and the second electronic switch are coupled to the micro controller.

In an embodiment of the present invention, the second half-bridge switching circuit includes a third electronic switch and a fourth electronic switch coupled in series between the grounding terminal and the low-voltage power storage device. A node between the third electronic switch and the fourth electronic switch is coupled to the second resonant capacitor.

The control terminals of the third electronic switch and the fourth electronic switch are coupled to the micro controller.

In an embodiment of the present invention, the first electronic switch, the second electronic switch, the third electronic switch, and the fourth electronic switch are GaN field-effect transistors (FETs).

In an embodiment of the present invention, the DPDT relay includes a first single pole double throw (SPDT) relay and a second single pole double throw (SPDT) relay. The first SPDT relay is coupled to the micro controller, the high-voltage terminal of the second secondary side winding, and the grounding terminal. The second SPDT relay is coupled to the micro controller, the high-voltage terminal of the first secondary side winding, and the grounding terminal.

In an embodiment of the present invention, the micro controller turns on the first electronic switch, the second electronic switch, the third electronic switch, and the fourth electronic switch in a zero current switching (ZCS) state.

In an embodiment of the present invention, when the micro controller operates in a charging mode, the micro controller turns on the second SPDT relay, the first electronic switch, and the fourth electronic switch and turns off the first SPDT relay, the second electronic switch, and the third electronic switch during a first time period and the micro controller turns on the second SPDT relay, the second electronic switch, and the third electronic switch and turns off the first SPDT relay, the first electronic switch, and the fourth electronic switch during a second time period after the first time period. During the first time period, a first current sequentially flows from the high-voltage power storage device to the high-voltage terminal of the primary side winding through the first electronic switch and the first resonant capacitor and a second current sequentially flows from the high-voltage terminal of the first secondary side winding to the low-voltage terminal of the first secondary side winding through the second SPDT relay, the fourth electronic switch, the second resonant capacitor, and the resonant inductor. During the second time period, a third current sequentially flows from the high-voltage terminal of the primary side winding to the low-voltage terminal of the primary side winding through the first resonant capacitor and the second electronic switch and a fourth current sequentially flows from the high-voltage terminal of the first secondary side winding to the low-voltage terminal of the first secondary side winding through the resonant inductor, the second resonant capacitor, the third electronic switch, the low-voltage power storage device, and the second SPDT relay.

In an embodiment of the present invention, when the micro controller operates in a discharging mode, the micro controller turns on the first SPDT relay, the third electronic switch, and the second electronic switch and turns off the second SPDT relay, the first electronic switch, and the fourth electronic switch during a third time period and the micro controller turns on the first SPDT relay, the fourth electronic switch, and the second electronic switch and turns off the second SPDT relay, the first electronic switch, and the third electronic switch during a fourth time period after the third time period. During the third time period, a fifth current sequentially flows from the low-voltage power storage device to the grounding terminal through the third electronic switch, the second resonant capacitor, the resonant inductor, the low-voltage terminal of the second secondary side winding, the high-voltage terminal of the second secondary side winding, and the first SPDT relay and a sixth current sequentially flows from the low-voltage terminal of the primary side winding to the high-voltage terminal of the primary side winding through the second electronic switch and the first resonant capacitor. During the fourth time period, a seventh current sequentially flows from the low-voltage terminal of the second secondary side winding to the high-voltage terminal of the second secondary side winding through the resonant inductor, the second resonant capacitor, the fourth electronic switch, and the first SPDT relay and an eighth current sequentially flows from the high-voltage terminal of the primary side winding to the high-voltage power storage device through the first resonant capacitor and the first electronic switch.

In an embodiment of the present invention, the high-voltage power storage device has a first terminal voltage V1, the low-voltage power storage device has a second terminal voltage V2, the primary side winding has a first turn number R1, the first secondary side winding has a second turn number R2, the second secondary side winding has a third turn number R3, $R1/R2 \leq V1/V2$, and $R1/R3 \geq V1/V2$.

To sum up, the bidirectional voltage conversion device employs the DPDT relay to change the voltage conversion ratio to operate in the charging mode or the discharging mode, thereby solving the problem with complex switching frequency adjustment for a single transformer. Besides, the bidirectional voltage conversion device flexibly adapts to the charging and discharging requirements of vehicular batteries, such that the bidirectional voltage conversion device is suitable for a variety of different scenarios and applications. The bidirectional voltage conversion device switches the DPDT relay to endlessly or interruptedly switch modes, thereby guaranteeing smooth operation and efficient energy transmission.

Below, the embodiments are described in detail in cooperation with the drawings to make easily understood the technical contents, characteristics and accomplishments of the present invention.

DETAILED DESCRIPTION OF THE INVENTION

Figure 1:
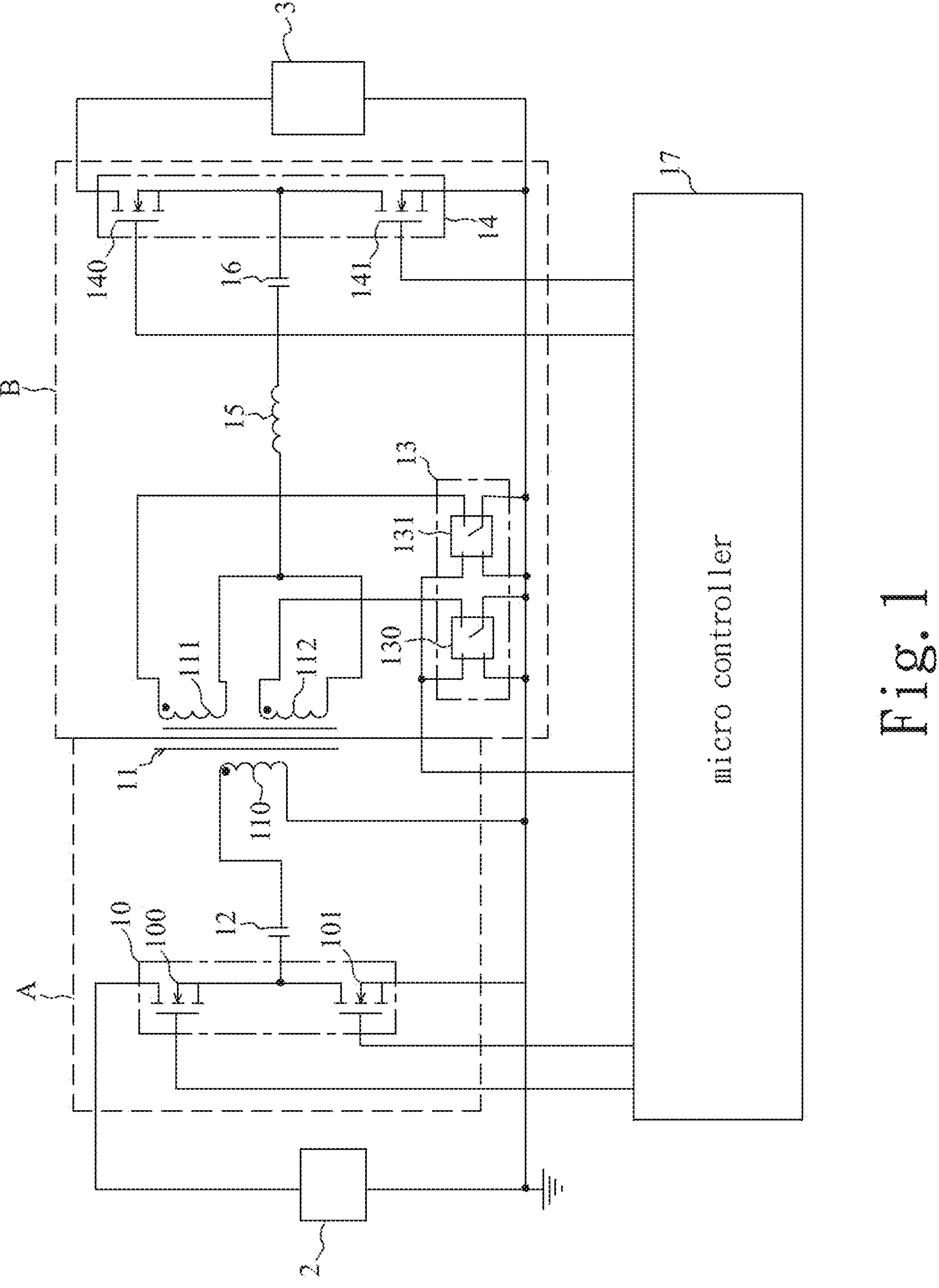
FIG. 1 is a schematic diagram illustrating a bidirectional voltage conversion device according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Furthermore, it can be understood that the terms "comprising," "including," "having," "containing," and "involving" are open-ended terms, which refer to "may include but is not limited to so." In addition, each of the embodiments or claims of the present invention is not necessary to achieve all the effects and advantages possibly to be generated, and the abstract and title of the present invention is used to assist for patent search and is not used to further limit the claimed scope of the present invention.

In addition, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

The present invention will provide a bidirectional voltage conversion device, which employs a double-pole double-throw (DPDT) relay to change the voltage conversion ratio to operate in the charging mode or the discharging mode, thereby solving the problem with complex switching frequency adjustment for a single transformer. Besides, the bidirectional voltage conversion device flexibly adapts to the charging and discharging requirements of vehicular batteries, such that the bidirectional voltage conversion device is suitable for a variety of different scenarios and applications. The bidirectional voltage conversion device switches the DPDT relay to endlessly or interruptedly switch modes, thereby guaranteeing smooth operation and efficient energy transmission.

FIG. 1 is a schematic diagram illustrating a bidirectional voltage conversion device according to an embodiment of the present invention. Referring to FIG. 1, a bidirectional voltage conversion device includes a first half-bridge switching circuit 10, a transformer 11, a first resonant capacitor 12, a double-pole double-throw (DPDT) relay 13, a second half-bridge switching circuit 14, a resonant inductor 15, and a second resonant capacitor 16. The first resonant capacitor 12 and the second resonant capacitor 16 may be film capacitors. The first half-bridge switching circuit 10 is coupled to a high-voltage power storage device 2. The transformer 11 has a primary side winding 110, a first secondary side winding 111, and a second secondary side winding 112. The low-voltage terminal of the primary side winding 110 is coupled to a grounding terminal and the low-voltage terminals of the first secondary side winding 111 and the second secondary side winding 112 are coupled to each other. One terminal of the first resonant capacitor 12 is coupled to the first half-bridge switching circuit 10 and another terminal of the first resonant capacitor 12 is coupled to the high-voltage terminal of the primary side winding 110. The DPDT relay 13 is coupled to the high-voltage terminal of the first secondary side winding 111, the high-voltage terminal of the second secondary side winding 112, and the grounding terminal. The second half-bridge switching circuit 14 is coupled to a low-voltage power storage device 3. The resonant inductor 15 and the second resonant capacitor 16 are coupled in series between the second half-bridge switching circuit 14 and a node between the low-voltage terminals of the first secondary side winding 111 and the second secondary side winding 112. The first half-bridge switching circuit 10, the first resonant capacitor 12, and the primary side winding 110 form a direct-current (DC) to alternating-current (AC) converter A. The first secondary side winding 111, the second secondary side winding 112, the DPDT relay 13, the second half-bridge switching circuit 14, the resonant inductor 15, and the second resonant capacitor 16 form an AC to DC converter B. Compared to the conventional technology, the bidirectional voltage conversion device merely installs one resonant capacitor on the primary side or the secondary side to effectively reduce the number of capacitors, a volume, and a cost. In some embodiments of the present invention, the bidirectional voltage conversion device further includes a micro controller 17 coupled to the first half-bridge switching circuit 10, the second half-bridge switching circuit 14, and the DPDT relay 13. The high-voltage power storage device 2 is exemplified by a power grid and the low-voltage power storage device 3 is exemplified by a vehicular battery. The high-voltage power storage device 2 has a first terminal voltage V1 and the low-voltage power storage device 3 has a second terminal voltage V2. The primary side winding 110 has a first turn number R1, the first secondary side winding 111 has a second turn number R2, the second secondary side winding 112 has a third turn number R3, R1/R2≤V1/V2, and R1/R3=V1/V2. For example, when the first terminal voltage V1 is 200 V and the second terminal voltage V2 is 20 V, the first turn number R1=35, the second turn number R2=4, and the third turn number R3=3.5.

The first half-bridge switching circuit 10 may include, but is not limited to, a first electronic switch 100 and a second electronic switch 101. The first electronic switch 100 and the second electronic switch 101 are coupled in series between the grounding terminal and the high-voltage power storage device 2. A node between the first electronic switch 100 and the second electronic switch 101 is coupled to the first resonant capacitor 12. The control terminals of the first electronic switch 100 and the second electronic switch 101 are coupled to the micro controller 17. The second half-bridge switching circuit 14 may include, but is not limited to, a third electronic switch 140 and a fourth electronic switch 141. The third electronic switch 140 and the fourth electronic switch 141 are coupled in series between the grounding terminal and the low-voltage power storage device 3. A node between the third electronic switch 140 and the fourth electronic switch 141 is coupled to the second resonant capacitor 16. The control terminals of the third electronic switch 140 and the fourth electronic switch 141 are coupled to the micro controller 17. For example, the first electronic switch 100 and the second electronic switch 101 may be, but not limited to, high-voltage GaN field-effect transistors (FETs) that are used to receive high voltage outputted by the high-voltage power storage device 2. The third electronic switch 140 and the fourth electronic switch 141 may be, but not limited to, low-resistance GaN field-effect transistors that are used to help the low-voltage power storage device 3 receive high-power energy. The channel of the GaN field-effect transistor is formed in GaN material. The DPDT relay 13 may include, but is not limited to, a first single pole double throw (SPDT) relay 130 and a second single pole double throw (SPDT) relay 131. The first SPDT relay 130 is coupled to the micro controller 17, the high-voltage terminal of the second secondary side winding 112, and the grounding terminal. The second SPDT relay 17 131 is coupled to the micro controller 17, the high-voltage terminal of the first secondary side winding 111, and the grounding terminal.

The micro controller 17 may generate asquare control signal to control the first electronic switch 100, the second electronic switch 101, the third electronic switch 140, and the fourth electronic switch 141. In general, the square control signal may have an operating frequency of 250~450 kHz that are used to adjust the output power of the primary side or the secondary side of the bidirectional voltage conversion device rather than the output voltage of the primary side or the secondary side. Besides, the duty cycle of the square control signal is used to adjust the conversion efficiency of the bidirectional voltage conversion device rather than the output power of the primary side or the secondary side of the bidirectional voltage conversion device. As a result, properly adjusting the duty cycle of the square control signal can maximize the conversion efficiency of the bidirectional voltage conversion device. In an embodiment of the present invention, when the micro controller 17 turns on the first electronic switch 100, the second electronic switch 101, the third electronic switch 140, and the fourth electronic switch 141 in a zero current switching (ZCS) state, the higher conversion efficiency of electric energy can be obtained.

Figure 2A:
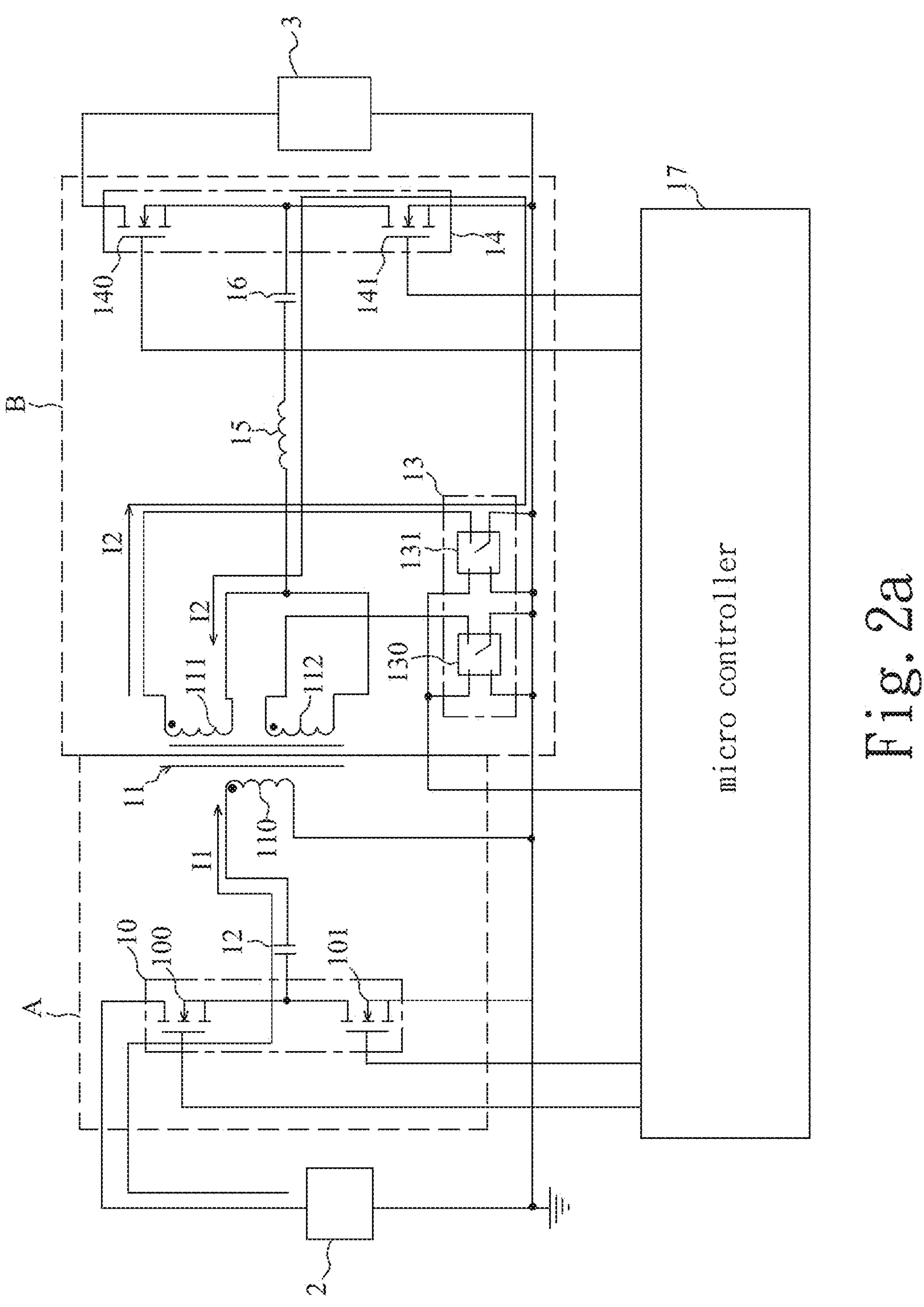
FIGS. 2*a*-2*b* are schematic diagrams illustrating a bidirectional voltage conversion device that operates in a charging mode according to an embodiment of the present invention.
Figure 2B:
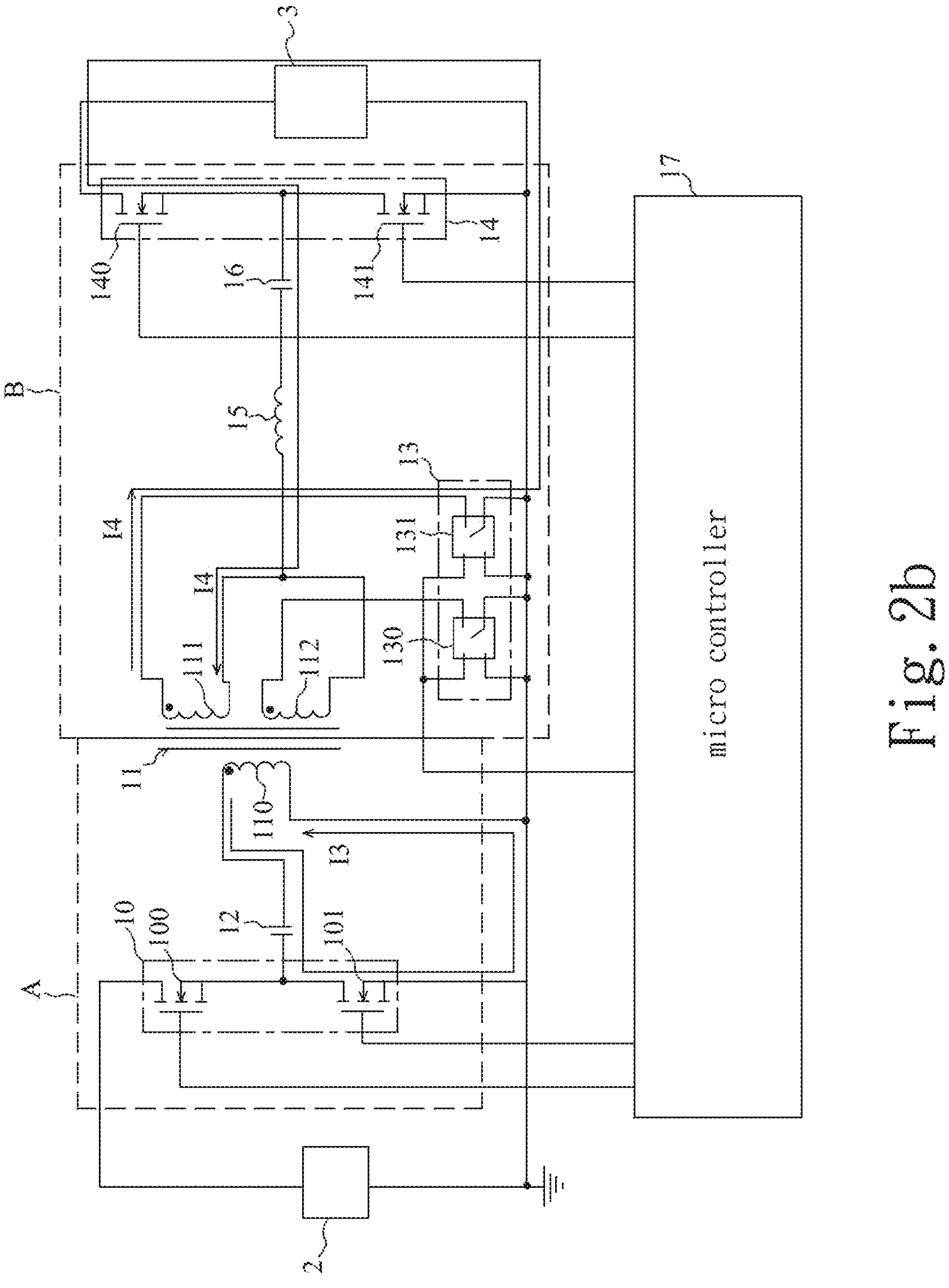

FIGS. 2*a*-2*b* are schematic diagrams illustrating a bidirectional voltage conversion device that operates in a charging mode according to an embodiment of the present invention. When the micro controller 17 operates in a charging mode, the micro controller 17 turns on the second SPDT relay 131, the first electronic switch 100, and the fourth electronic switch 141 and turns off the first SPDT relay 130, the second electronic switch 101, and the third electronic switch 140 during a first time period and the micro controller 17 turns on the second SPDT relay 131, the second electronic switch 101, and the third electronic switch 140 and turns off the first SPDT relay 130, the first electronic switch 100, and the fourth electronic switch 141 during a second time period after the first time period. As illustrated in FIG. 2*a*, during the first time period, a first current Il sequentially flows from the high-voltage power storage device 2 to the high-voltage terminal of the primary side winding 110 through the first electronic switch 100 and the first resonant capacitor 12 and a second current 12 sequentially flows from the high-voltage terminal of the first secondary side winding 111 to the low-voltage terminal of the first secondary side winding 111 through the second SPDT relay 131, the fourth electronic switch 141, the second resonant capacitor 16, and the resonant inductor 15. As illustrated in FIG. 2*b*, during the second time period, a third current 13 sequentially flows from the high-voltage terminal of the primary side winding 110 to the low-voltage terminal of the primary side winding 110 through the first resonant capacitor 12 and the second electronic switch 101 and a fourth current 14 sequentially flows from the high-voltage terminal of the first secondary side winding 111 to the low-voltage terminal of the first secondary side winding 111 through the resonant inductor 15, the second resonant capacitor 16, the third electronic switch 140, the low-voltage power storage device 3, and the second SPDT relay 131.

Figure 3A:
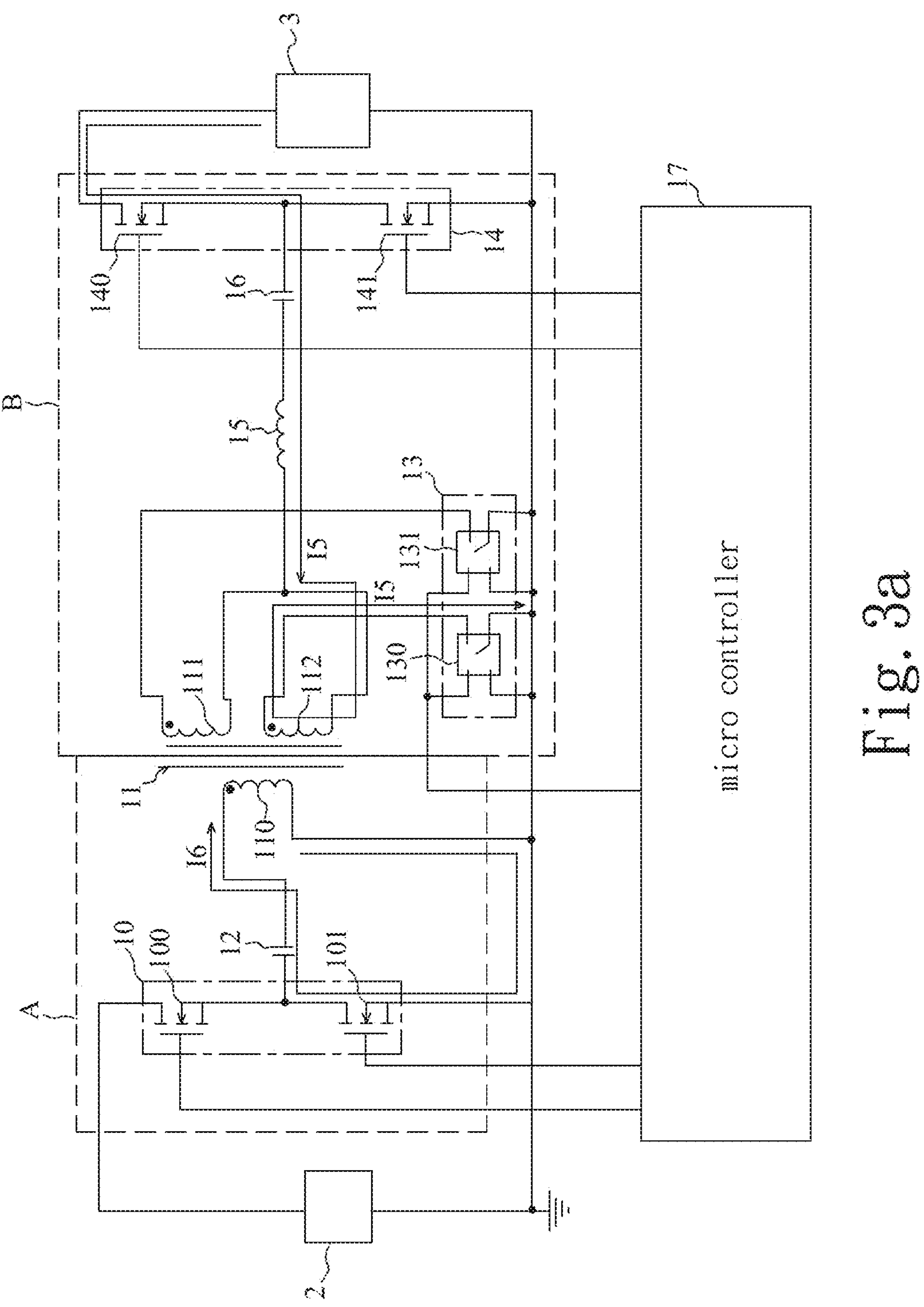
FIGS. 3*a*-3*b* are schematic diagrams illustrating a bidirectional voltage conversion device that operates in a discharging mode according to an embodiment of the present invention.
Figure 3B:
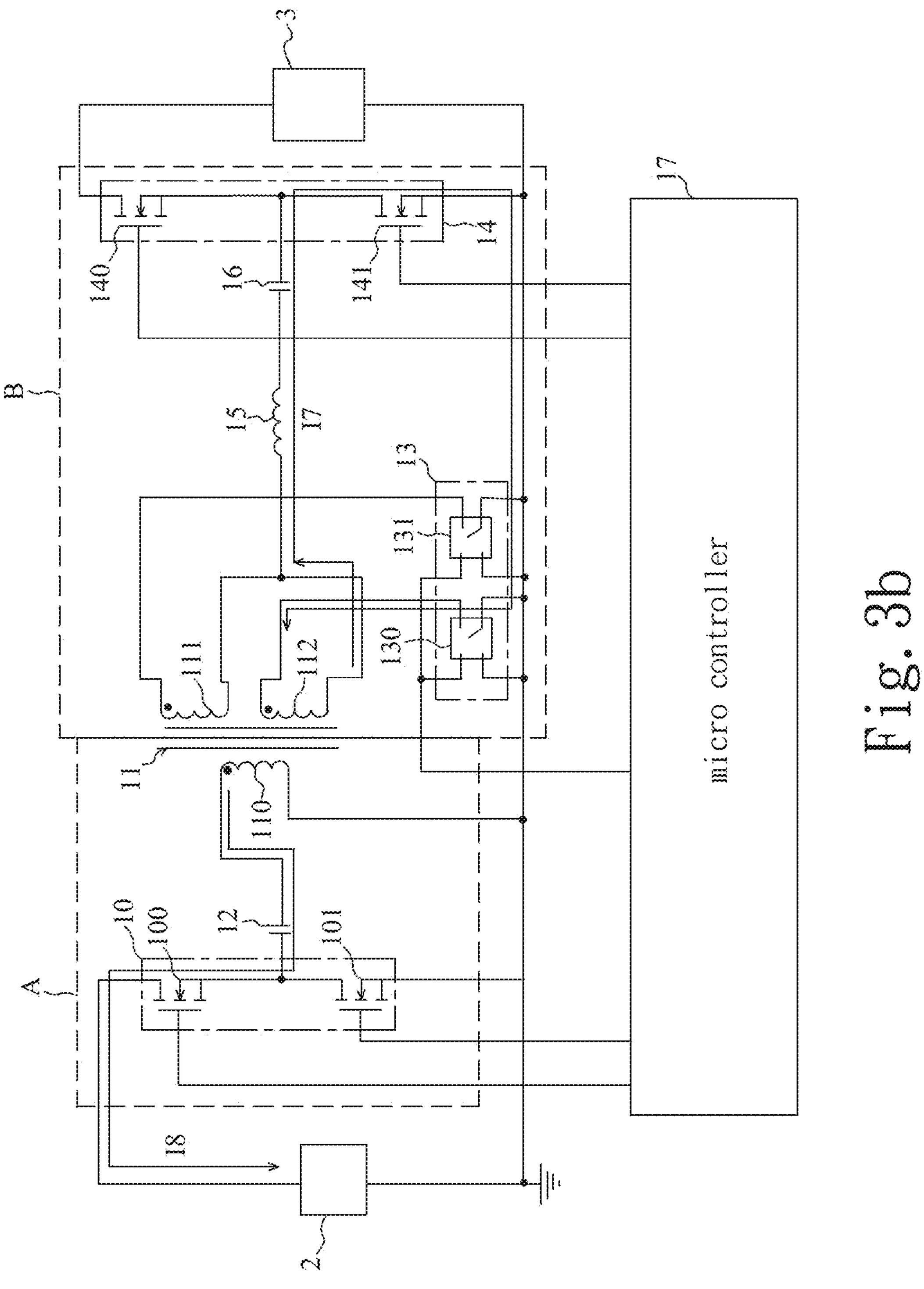

FIGS. 3*a*-3*b* are schematic diagrams illustrating a bidirectional voltage conversion device that operates in a discharging mode according to an embodiment of the present invention. When the micro controller 17 operates in a discharging mode, the micro controller 17 turns on the first SPDT relay 130, the third electronic switch 140, and the second electronic switch 101 and turns off the second SPDT relay 131, the first electronic switch 100, and the fourth electronic switch 141 during a third time period and the micro controller 17 turns on the first SPDT relay 130, the fourth electronic switch 141, and the second electronic switch 101 and turns off the second SPDT relay 131, the first electronic switch 100, and the third electronic switch 140 during a fourth time period after the third time period. As illustrated in FIG. 3*a*, during the third time period, a fifth current 15 sequentially flows from the low-voltage power storage device 3 to the grounding terminal through the third electronic switch 140, the second resonant capacitor 16, the resonant inductor 15, the low-voltage terminal of the second secondary side winding 112, the high-voltage terminal of the second secondary side winding 112, and the first SPDT relay 130 and a sixth current 16 sequentially flows from the low-voltage terminal of the primary side winding 110 to the high-voltage terminal of the primary side winding 110 through the second electronic switch 101 and the first resonant capacitor 12. As illustrated in FIG. 3*b*, during the fourth time period, a seventh current 17 sequentially flows from the low-voltage terminal of the second secondary side winding 112 to the high-voltage terminal of the second secondary side winding 112 through the resonant inductor 15, the second resonant capacitor 16, the fourth electronic switch 141, and the first SPDT relay 130 and an eighth current 18 sequentially flows from the high-voltage terminal of the primary side winding 110 to the high-voltage power storage device 2 through the first resonant capacitor 12 and the first electronic switch 100. As a result, the bidirectional voltage conversion device employs the DPDT relay 13 to change the voltage conversion ratio to operate in the charging mode or the discharging mode, thereby solving the problem with complex switching frequency adjustment for a single transformer, simplifying the circuit design, and improving the overall efficiency and reliability. That is to say, the bidirectional voltage conversion device can perform bidirectional power transmission without using any voltage adjusting devices. In addition, the bidirectional voltage conversion device can flexibly adapt to the needs of charging and discharging vehicle batteries, such that the bidirectional voltage conversion device is suitable for various scenarios and applications. The bidirectional voltage conversion device switches the DPDT relay 13 to endlessly or interruptedly switch modes, thereby guaranteeing smooth operation and efficient energy transmission.

Figure 4:
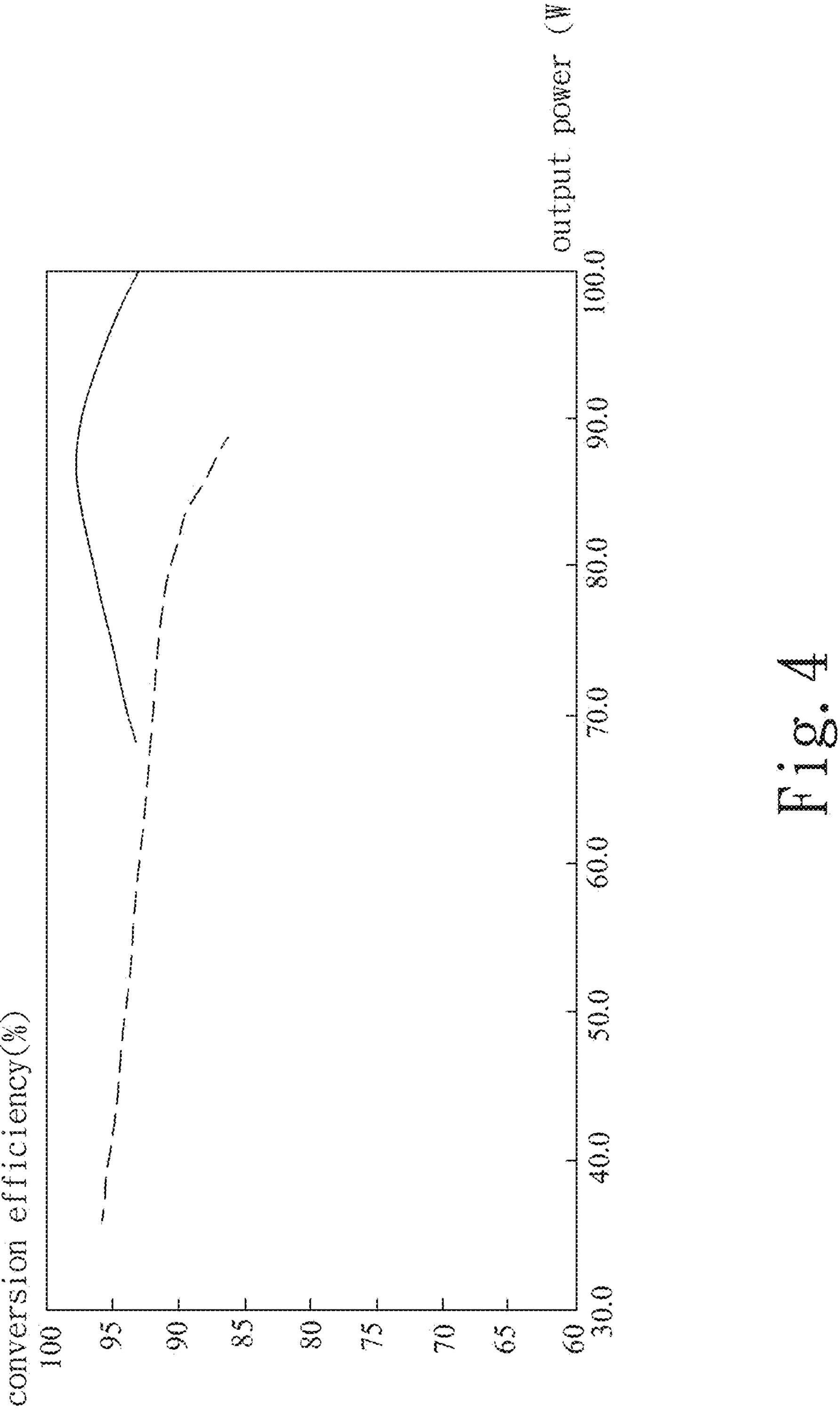
FIG. 4 is a schematic diagram illustrating a conversion efficiency versus output power curve of a bidirectional voltage conversion device according to an embodiment of the present invention.

FIG. 4 is a schematic diagram illustrating a conversion efficiency versus output power curve of a bidirectional voltage conversion device according to an embodiment of the present invention. Please refer to FIG. 4. The solid line corresponds to the charging mode and the dashed line corresponds to the discharging mode. Power losses may include resistive losses, switching losses, and core losses, where the core loss is a function of the frequency of the switch and the current passing through the switch. The resistive loss is only a function of average current. The switching loss is a function of the switching frequency and the voltage across the largest resonant capacitor when the transistor is turned off. As illustrated in FIG. 4, in the charging mode, the average power conversion efficiency is 95% between 70 and 100 watts of output power. In the discharge mode, power is discharged from the vehicular battery to the grid and the DPDT relay is used to change the voltage ratio of the transformer from 35:4 to 35:3.5. As illustrated in FIG. 4, in the charging mode, the average power efficiency is 92% when the output power ranges between 35 and 85 watts. The difference in efficiency may be due to the inconsistency of the magnetizing currents. The discharging mode requires more magnetizing current because the turn number of the secondary side winding is much less than the turn number of the primary winding. Magnetization inconsistency results in a large difference in resonant frequency. The designed switching frequency can only match the charging mode rather than the discharging mode.

Therefore, the conversion efficiency of the charging mode is higher than that of the discharge mode.

According to the embodiments provided above, the bidirectional voltage conversion device employs the DPDT relay to change the voltage conversion ratio to operate in the charging mode or the discharging mode, thereby solving the problem with complex switching frequency adjustment for a single transformer. Besides, the bidirectional voltage conversion device flexibly adapts to the charging and discharging requirements of vehicular batteries, such that the bidirectional voltage conversion device is suitable for a variety of different scenarios and applications.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A bidirectional voltage conversion device comprising:
- a first half-bridge switching circuit coupled to a high-voltage power storage device;
- a transformer having a primary side winding, a first secondary side winding, and a second secondary side winding, wherein a low-voltage terminal of the primary side winding is coupled to a grounding terminal and low-voltage terminals of the first secondary side winding and the second secondary side winding are coupled to each other;
- a first resonant capacitor with one terminal thereof coupled to the first half-bridge switching circuit and another terminal of the first resonant capacitor is coupled to a high-voltage terminal of the primary side winding;
- a double-pole double-throw (DPDT) relay coupled to a high-voltage terminal of the first secondary side winding, a high-voltage terminal of the second secondary side winding, and the grounding terminal;
- a second half-bridge switching circuit coupled to a low-voltage power storage device; and
- a resonant inductor and a second resonant capacitor coupled in series between the second half-bridge switching circuit and a node between the low-voltage terminals of the first secondary side winding and the second secondary side winding.

2. The bidirectional voltage conversion device according to claim 1, further comprising a micro controller coupled to the first half-bridge switching circuit, the second half-bridge switching circuit, and the DPDT relay.

3. The bidirectional voltage conversion device according to claim 2, wherein the first half-bridge switching circuit comprises a first electronic switch and a second electronic switch coupled in series between the grounding terminal and the high-voltage power storage device, a node between the first electronic switch and the second electronic switch is coupled to the first resonant capacitor, and control terminals of the first electronic switch and the second electronic switch are coupled to the micro controller.

4. The bidirectional voltage conversion device according to claim 3, wherein the second half-bridge switching circuit comprises a third electronic switch and a fourth electronic switch coupled in series between the grounding terminal and the low-voltage power storage device, a node between the third electronic switch and the fourth electronic switch is coupled to the second resonant capacitor, and control terminals of the third electronic switch and the fourth electronic switch are coupled to the micro controller.

5. The bidirectional voltage conversion device according to claim 4, wherein the first electronic switch, the second electronic switch, the third electronic switch, and the fourth electronic switch are GaN field-effect transistors (FETs).

6. The bidirectional voltage conversion device according to claim 4, wherein the DPDT relay comprises:
- a first single pole double throw (SPDT) relay coupled to the micro controller, the high-voltage terminal of the second secondary side winding, and the grounding terminal; and
- a second single pole double throw (SPDT) relay coupled to the micro controller, the high-voltage terminal of the first secondary side winding, and the grounding terminal.

7. The bidirectional voltage conversion device according to claim 6, wherein the micro controller turns on the first electronic switch, the second electronic switch, the third electronic switch, and the fourth electronic switch in a zero current switching (ZCS) state.

8. The bidirectional voltage conversion device according to claim 6, wherein when the micro controller operates in a charging mode, the micro controller turns on the second SPDT relay, the first electronic switch, and the fourth electronic switch and turns off the first SPDT relay, the second electronic switch, and the third electronic switch during a first time period and the micro controller turns on the second SPDT relay, the second electronic switch, and the third electronic switch and turns off the first SPDT relay, the first electronic switch, and the fourth electronic switch during a second time period after the first time period; during the first time period, a first current sequentially flows from the high-voltage power storage device to the high-voltage terminal of the primary side winding through the first electronic switch and the first resonant capacitor and a second current sequentially flows from the high-voltage terminal of the first secondary side winding to the low-voltage terminal of the first secondary side winding through the second SPDT relay, the fourth electronic switch, the second resonant capacitor, and the resonant inductor; and during the second time period, a third current sequentially flows from the high-voltage terminal of the primary side winding to the low-voltage terminal of the primary side winding through the first resonant capacitor and the second electronic switch and a fourth current sequentially flows from the high-voltage terminal of the first secondary side winding to the low-voltage terminal of the first secondary side winding through the resonant inductor, the second resonant capacitor, the third electronic switch, the low-voltage power storage device, and the second SPDT relay.

9. The bidirectional voltage conversion device according to claim 8, wherein when the micro controller operates in a discharging mode, the micro controller turns on the first SPDT relay, the third electronic switch, and the second electronic switch and turns off the second SPDT relay, the first electronic switch, and the fourth electronic switch during a third time period and the micro controller turns on the first SPDT relay, the fourth electronic switch, and the second electronic switch and turns off the second SPDT relay, the first electronic switch, and the third electronic switch during a fourth time period after the third time period; during the third time period, a fifth current sequentially flows from the low-voltage power storage device to the grounding terminal through the third electronic switch, the second resonant capacitor, the resonant inductor, the low-voltage terminal of the second secondary side winding, the high-voltage terminal of the second secondary side winding, and the first SPDT relay and a sixth current sequentially flows from the low-voltage terminal of the primary side winding to the high-voltage terminal of the primary side winding through the second electronic switch and the first resonant capacitor; and during the fourth time period, a seventh current sequentially flows from the low-voltage terminal of the second secondary side winding to the high-voltage terminal of the second secondary side winding through the resonant inductor, the second resonant capacitor, the fourth electronic switch, and the first SPDT relay and an eighth current sequentially flows from the high-voltage terminal of the primary side winding to the high-voltage power storage device through the first resonant capacitor and the first electronic switch.

10. The bidirectional voltage conversion device according to claim 1, wherein the high-voltage power storage device has a first terminal voltage V1, the low-voltage power storage device has a second terminal voltage V2, the primary side winding has a first turn number R1, the first secondary side winding has a second turn number R2, the second secondary side winding has a third turn number R3, $R1/R2 \leq V1/V2$, and $R1/R3 \geq V1/V2$.

* * * * *